May 19, 1953    A. D. McDUFFIE ET AL    2,638,781
FORCE MEASURING APPARATUS
Filed Oct. 6, 1948    2 Sheets—Sheet 1

Inventors
Archie D. McDuffie &
Warren H. Smith
By
Attorneys

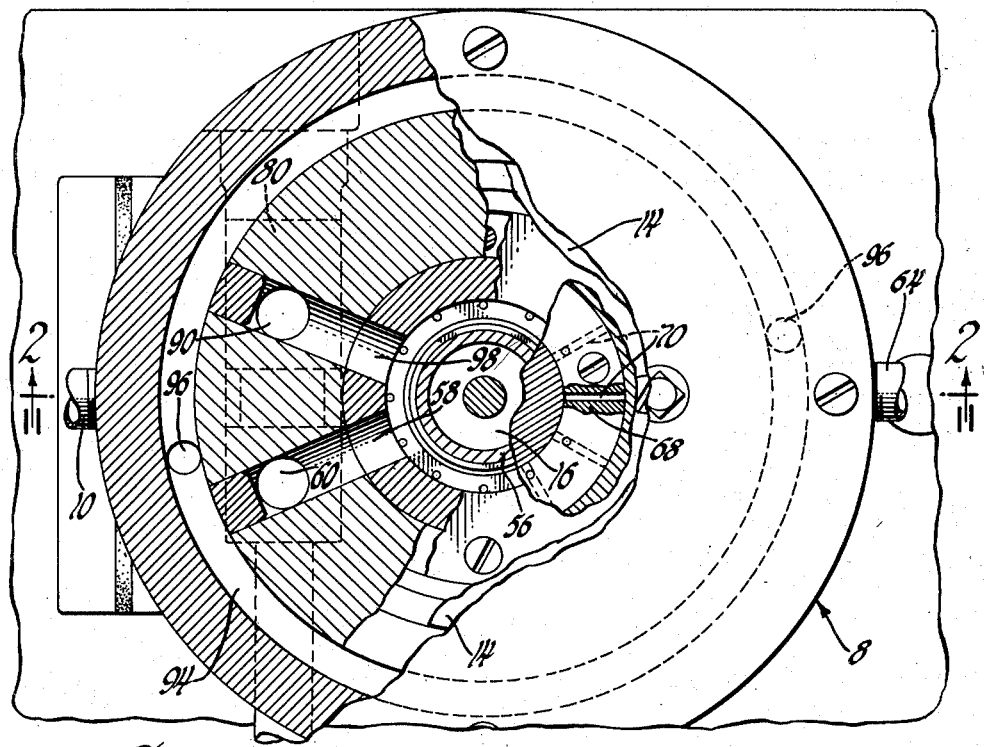
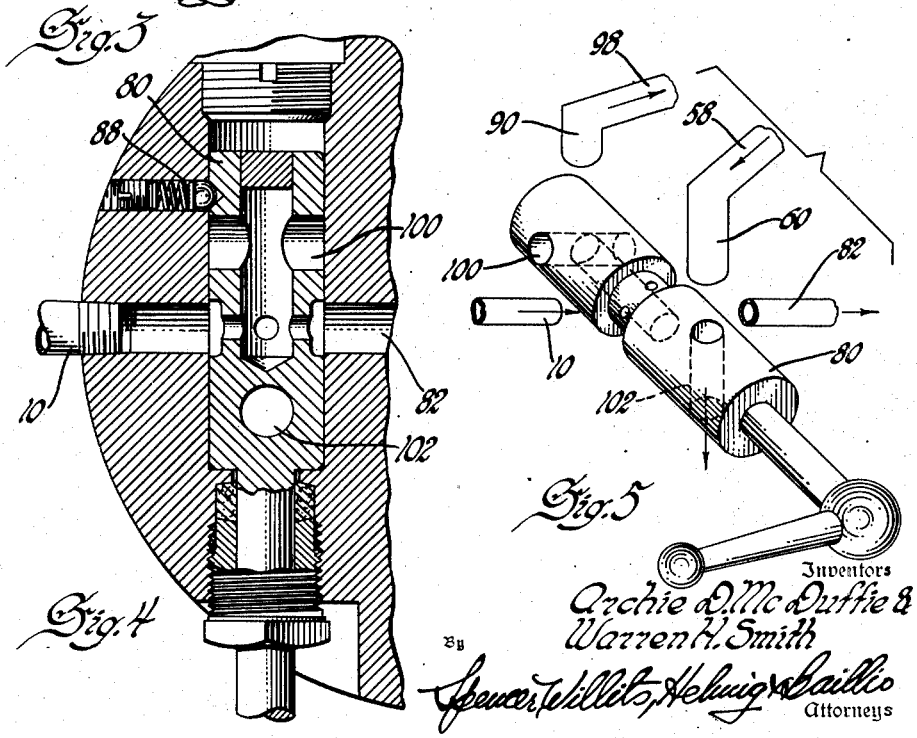

Patented May 19, 1953

2,638,781

UNITED STATES PATENT OFFICE 2,638,781

FORCE MEASURING APPARATUS

Archie D. McDuffie, Berkley, and Warren H. Smith, Detroit, Mich., assignors to General Motors Corporation, Detroit, Mich., a corporation of Delaware Application October 6, 1948, Serial No. 53,072

5 Claims. (Cl. 73—134)

The present invention relates to fluid means for measuring force and/or torque. More particularly it relates to a double range fluid force measuring means in which the fluid pressure is used as an indication of the force being measured.

Scales used to measure dynamometer torques are subject to quite severe force impulses, vibration and other adverse operating conditions. Spring scale have very little damping action and therefore, the indicator vibrates greatly making them difficult to read when subjected to loads having vibratory components. Beam balance scales, although accurate, require an appreciable amount of time for balancing and are not suitable for use when continuously varying torques are being measured. Previously used single piston hydraulic scales, in which the force is determined by measuring the hydraulic pressure, are not subject to the disadvantages enumerated above, but are quite limited in their range of application. These single piston hydraulic scales have substantially the same absolute accuracy throughout the range of pressures used. For this reason the percentage accuracy, which is of course the most important measure of accuracy, is very low, when hydraulic scales suitable for measuring high forces is used to measure forces of small magnitude.

It is therefore an object of the present invention to produce a fluid force indicating means suitable for measuring a wide range of force magnitudes.

It is a further object of the present invention to produce a fluid force measuring means suitable for use with a dynamometer.

It is a further object of the present invention to produce a dynamometer torque measuring means which is highly accurate through a plurality of ranges of torques, and one which has suitable damping to minimize torque observation errors.

It is a further object of the present invention to produce a force measuring means which is economical to construct, accurate in indication and foolproof in operation.

Other objects of this invention will become apparent upon reading the specification and inspection of the drawings and will be particularly pointed out in the claims.

Referring to the drawings,

Figure 3 is a horizontal partial sectional view taken along the line 3—3 of Figure 2.

Figure 4 is a partial sectional view of the control valves of the hydraulic scales taken along the line 4—4 of Figure 2.

Figure 5 is a phantom view of the control valve and its porting.

Figure 1:
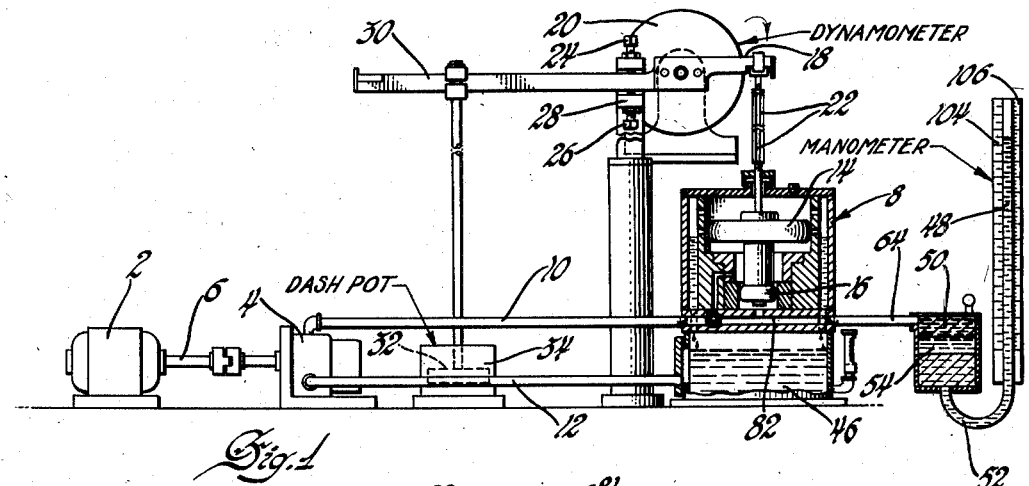
Figure 1 is a general arrangement of the present invention.

Referring more particularly to Figure 1, 2 is an electric motor of commercial design which may be energized from any suitable source of power not shown. 4 is a hydraulic pump of suitable commercial design which is driven by means of motor 2 and drive shaft 6. If it is desired to use a gaseous fluid instead of a liquid fluid, as specifically shown in the drawings, this pump 4 could be a blower of suitable design. The high pressure output of the pump 4 is transferred to the hydraulic scales here shown generally as 8 by means of conduit 10. 12 is a return conduit from the scales 8 to the pump 4. The pistons 14 and 16 of the hydraulic scales 8 are connected to the torque arm 18 of the dynamometer 20 by means of adjustable connecting rod 22. The dynamometer 20 may be of any conventional design and is here schematically shown as an electrical dynamometer. The torque arm 18 is rigidly secured to the casing of the dynamometer and is free to receive torque from this casing and rotate a limited amount therewith. The amount of rotation permitted is determined by the position of the set screws 24 and 26 of the mechanical stop member 28. The extension 30 of the torque arm 18 has attached thereto the piston 32 of the dashpot 34. As will be more specifically described later in the specification, the pistons 14 and 16 are urged downwardly by the torque exerted by the arm 18. These pistons are maintained in position by fluid pressure introduced against the lower surfaces thereof as will be noted later in the specification. A valve is provided to permit this pressure being introduced to either the piston 16 or to both the piston 16 and the piston 14. This fluid pressure urges the pistons upwardly against the force exerted on them by the dynamometer so as to open ports in the side of their mating cylinders where a balance between the fluid pressure and the force is reached. The oil coming from these ports returns to the sump 46 of the hydraulic scales where it is recirculated by the pump 4. The pressure necessary to maintain the pistons in equilibrium is measured by noting the height of the column in manometer tube 48. It is not necessary to use the same fluid in the manometer tube as is used in the fluid scales; for example, a gas or liquid may be used in the hydraulic scales and its pressure measured by means of a column of fluid of some other type in the manometer tube. As specifically here illustrated, an oil 50 of low viscosity may be used in the hydraulic scales and a column 52 of mercury used in manometer tube. These two liquids are separated by a layer of water 54. It may thus be readily seen that the force exerted by the dynamometer torque arm 18 is balanced by a fluid pressure, and this force is equal to the fluid pressure multiplied by the area of the piston or pistons subject to the force. (The area ratio of the pistons 16 and 14 as specifically illustrated is 1 to 10.)

Figure 2:
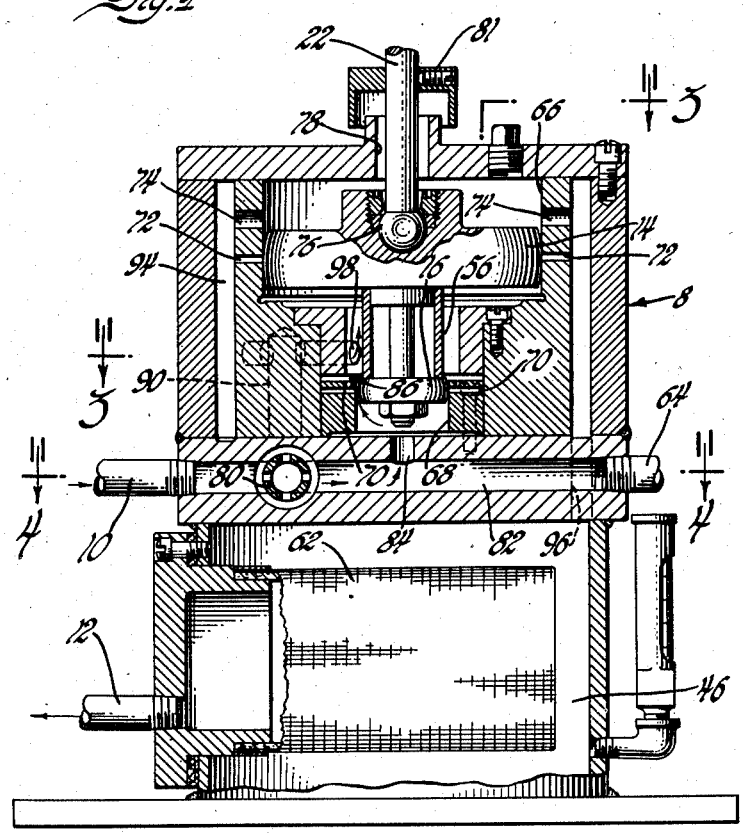
Figure 2 is a cross section of the hydraulic scales which is part of the present invention and is taken along the line 2—2 of Figure 3.

Referring more particularly to Figure 2, the hydraulic force measuring scales is here shown to a larger scale and in greater detail. Here are shown the pistons 14 and 16 with their mating cylinders 66 and 68 and the associated oil conduits for operation of the scales. These pistons are mounted coaxially and held in a proper displaced relationship by means of spacer 56. It is quite important in the operation of this device that the axial displacement of the pistons have a proper relationship to the distance between the ports 70 and 72. These ports permit the exhaust of oil pressure from the pistons. The location of the ports 74 is not critical, these ports being merely overflow ports or bypass ports to bypass the conduits 72. The rod 22 is attached to the piston 14 by means of a ball and socket joint 76 to permit some angular movement of the arm 22 without causing canting or binding of the pistons 14 and 16 in their mating cylinders. The plunger or rod 22 is inserted through a clearance opening 78 to permit this angular movement and a cap 81 is attached to 22 to cover this opening thus preventing foreign matter from getting into the cylinder 66.

Pressure may be introduced to the lower side of the piston 16 or to the lower side of this piston and also the piston 14 depending upon the position of the valve 80. Under all positions of this valve, oil under pressure is permitted to enter through the conduit 10, the conduit 82 and the port 84 to the lower side of the piston 16. Under these conditions the pressure under the piston 16 counteracts all forces exerted by the plunger or rod 22. As the force exerted by the fluid pressure overcomes the force exerted by the rod 22, the piston 16 is pushed upwardly until the port 70 is opened. When this port is opened, the fluid is allowed to escape through this port and the port 86 to the area above the piston and hence through the conduits 58 and 60 back into the sump 46. Under such conditions the pressure in the cylinder 68 and hence, in the conduits 82 and 64 is maintained at a pressure just sufficient to neutralize the force exerted on the rod 22 and keep the system in equilibrium. Under this condition of operation, the pressure in the conduit 64, times the area of the piston 16 is equal to the force exerted by the plunger 22 plus or minus any zero set made necessary by the unbalanced weight of the system.

The oil which returns to the sump 46 is filtered by the filter 62 and returned to the pump 4 through the conduit 12 and again put under pressure to operate the system.

Referring now also to Figures 3, 4 and 5, a valving and porting arrangement is shown which permits the simultaneous introduction of fluid pressure on both pistons 14 and 16. In the valve position shown in the phantom view of Figure 5, pressure is introduced only to the smaller piston as described above. This valve however may be turned to an angle of 90° to another indexed position and maintain this position by detent and spring arrangement 88. In this new position the conduit 60 is closed and the conduit 90 opened. Under these conditions fluid is introduced to the lower side of the small piston through port 84 as described above, and fluid is also introduced through the conduit 90 and the port 98 to the lower side of the piston 14. The egress of oil through the port 58 and conduit 60 is prevented by the position of the valve 80. Under these conditions the pressure under both pistons cooperates to oppose the force being exerted by the rod 22 and the pistons are moved upwardly until the ports 72 are unmasked by the piston 14 allowing the oil to escape back through the sump openings 94 and the conduit 96. The openings of the portion 72 relieves pressure under the piston 14 and thus permits the system to seek an equilibrium state at a point where the pressure under the pisons 14 and 16 times the cross section area of the piston 14 equals the force being exerted by the rod 22. It may readily be seen that the force under the piston 16 is maintained at all times under this condition of operation to exactly the same pressure as that under the piston 14. This pressure of course is the same pressure as that now present in the conduit 64.

*Operation*

The system as decribed above is secured to a dynamometer 20 of conventional design and the dynamometer system placed in operation. If the torque to be measured is small, the valve 80 is placed in the position shown in Figures 4 and 5. If the torque to be measured is great, the valve 80 is displaced 90° to that shown in these figures so as to align the conduit 90 with the port 100, and the port 102 is displaced so as to close the conduit 60. With the valve set in either of these two positions, depending upon the order of magnitude of the torque to be measured, the dynamometer is started and the motor 2 energized. The operation of the pump 5 by the motor introduces a pressure in the line 10 which is determined by the back pressure caused to be formed by the force on the arm 22. When the system reaches an equilibrium state as described above, the pressure in the conduit 64 is an exact indication of the force exerted on the rod 22. This pressure is also exerted by the oil 50 through the water 54 to the mercury 52 in the manometer tube 48. This pressure may be readily determined by observing the height of the mercury in the tube in the ordinary manner. Under normal conditions of operation, this manometer has two sets of graduations 104 and 106. One of these is calibrated in units of torque using the small piston 16 alone, and the other is calibrated in units of torque using both pistons. It may thus be readily seen that the torque exerted by the element 20 is accurately determined by observing the height of the mercury in the manometer tube 48 on thhe correct calibration either 104 or 106 depending upon the position of the valve 80.

It is to be understood also that although the invention has been described with specific reference to a particular embodiment thereof, it is not to be so limited, since changes and alterations therein may be made which are within the full intended scope of this invention as defined by the appended claims.

We claim:

1. A multirange force indicating means including; two pistons of different diameters coaxially located and axially displaced from each other and having mating cylinders, said pistons rigidly attached together and mechanically secured to a member capable of exerting force on said pistons, means for selectively introducing fluid under pressure to actuate either the smaller piston, or to actuate both pistons simultaneously, so as to exert a force in opposition to said first mentioned force, and means to measure the pressure of said fluid and thus determine the magnitude of said first mentioned force.

2. A multirange torque indicating apparatus including; means for translating a torque into a force, means for damping the fluctuation of said torque and its resulting force, and means for measuring said force, said last mentioned means including dual coaxial pistons with mating cylinders, said pistons being rigidly attached together and supported in said cylinders by fluid pressure capable of being selectively introduced to actuate one or both of said pistons in opposition to said force and means for measuring said fluid pressure.

3. A multirange force measuring apparatus including; two pistons of different diameters coaxially located and axially displaced from each other, means for transmitting an unknown force to be measured to said pistons, mating cylinders for said pistons, said cylinders having exhaust ports therein axially spaced the same distance as are said pistons, means for introducing a fluid under pressure selectively to one or both of said pistons, and a manometer tube to measure the pressure of said fluid and thereby determine the magnitude of said force.

4. A multirange force measuring apparatus including: two pistons of different diameters coaxially located and axially displaced from each other, means for transmitting an unknown force to be measured to said pistons, mating cylinders for said pistons, said cylinders having exhaust ports therein axially spaced the same distance as are said pistons, means for introducing a fluid under pressure selectively to one or both of said pistons, said means simultaneously allowing withdrawal of the fluid from one or the other of said exhaust ports, and a manometer tube to measure the pressure of said fluid and therefore determine the magnitude of said force.

5. A multirange force indicating means including; two positions of different diameters rigidly attached together and mechanically secured to a member capable of exerting force on said pistons, mating cylinders for said pistons having ports therein, means for selectively introducing fluid under pressure to actuate either the smaller piston, or to actuate both pistons simultaneously so as to exert a force in opposition to said first-mentioned force, said ports being adapted to allow the exhaust of the fluid pressure and thus maintain the pistons in a state of equilibrium, and means to measure the pressure of said fluid and thus determined the magnitude of said first-mentioned force.

ARCHIE D. McDUFFIE.
WARREN H. SMITH.

References Cited in the file of this patent

UNITED STATES PATENTS

| Number | Name | Date |
| --- | --- | --- |
| 1,650,736 | Zelov | Nov. 29, 1927 |
| 2,172,095 | White | Sept. 5, 1939 |
| 2,211,108 | Fitzgerald | Aug. 13, 1940 |
| 2,295,249 | Yates | Sept. 8, 1942 |
| 2,436,451 | Rosenberger | Feb. 24, 1948 |
| 2,493,012 | Moore et al. | Jan. 3, 1950 |
| 2,524,602 | Rosenberger | Oct. 3, 1950 |

FOREIGN PATENTS

| Number | Country | Date |
| --- | --- | --- |
| 563,563 | Great Britain | Aug. 21, 1944 |